Patented July 31, 1945

2,380,449

UNITED STATES PATENT OFFICE 2,380,449

PRODUCTION OF MAGNESIUM

Roy C. Kirk, Midland, Mich., assignor to The Dow Chemical Company, Midland, Mich., a corporation of Michigan No Drawing. Application May 2, 1942,
Serial No. 441,535

6 Claims. (Cl. 75—67)

This invention concerns an improved method of preparing magnesium by the thermal reduction of magnesium oxide, using carbon as the reducing agent.

It is known that magnesium can be prepared by heating a mixture of magnesium oxide or a magnesium oxide-containing material with carbon whereby magnesium is liberated as a vapor, which may be withdrawn and condensed. However, in commercial operations using impure magnesium oxide, difficulty has been experienced in the removal of the residue of this reaction from the reduction furnace, said residue consisting usually of compounds of calcium and silicon in the form of complex silicates. Normally the residue remaining is a sintered or a very hard solid and is removed only with difficulty. Such obvious and simple methods of removal as the use of screw conveyors cannot be used because of the size and hardness of the pieces to be removed.

It is, therefore, desirable to produce a solid residue which is powdered or easily powderable so that it can be conveniently removed from the furnace. It is the principal object of this invention to provide a method for the production of magnesium by the reduction of impure magnesium oxide which will produce such a powdered residue.

I have now found that a powdered residue can be obtained in the reduction of magnesium oxide with carbon by a process which comprises forming a charge consisting essentially of magnesium oxide, carbon in a proportion at least chemically equivalent thereto, lime, silica, and alumina, the lime, silica, and alumina being present in such proportions that the residue formed on reduction amounts to less than about 20 per cent of the total charge and has the composition:

| | Per cent by weight |
|---|---|
| CaO | 52 to 98.8 |
| SiO₂ | 0.1 to 48 |
| Al₂O₃ | 0.1 to 30 | and carrying out the reduction at a temperature below the fusion temperature of the residue.

Although the invention contemplates the broad range of proportions listed above, a preferred range of residue compositions is as follows:

| | Per cent by weight |
|---|---|
| CaO | 55 to 98.8 |
| SiO₂ | 0.1 to 15 |
| Al₂O₃ | 0.1 to 30 |

It is preferred that a reasonably pure magnesium oxide be used in order to maintain the percentage of residue as low as possible and less than about 20 per cent. For example, calcined dolomite cannot be used except where it is present in a minor proportion in an ore relatively richer in magnesia. Ordinarily the magnesium oxide is added as calcined magnesite. The carbon is ordinarily added as graphite, carbon black, coke, coal, etc. The lime, silica, and alumina may be present in pure form, as ores of these materials, or in combined form as in silicates and aluminates. It frequently occurs that the magnesium oxide from which the magnesium is to be liberated contains significant proportions of lime, silica, or alumina. It is necessary, therefore, to determine these proportions by chemical analysis and then adjust the charge to provide a residue having compositional proportions within the range indicated above. In many cases other constituents such as iron oxide will be found in the magnesia ore, but these additional ingredients are usually not present in a proportion sufficient to alter significantly the properties of the residue.

The residue should not exceed about 20 per cent of the charge in order to avoid hardening of the solid residue. That the hardening can be avoided by so restricting the proportion of residue is believed due to the fact that where a small proportion of residue is used, the particles of the inert material are far apart during most of the reaction time and have little opportunity to cling together. Where a large proportion of inert materials is used, however, the particles of said material are close together over a large fraction of the time they are exposed to the high temperature of the reduction furnace, and thereby have the opportunity to harden into a solid mass or at least into a difficultly powderable mass. Thus, the present invention depends on both a regulation of the proportions of the residual ingredients with respect to each other and a regulation of the proportion of the residue with respect to the total charge.

The temperature at which the reduction is best carried out is determined principally by the pressure in the reduction furnace and may vary from about 1400° C. at extremely low pressures to about 2100° C. at atmospheric pressure. However, for any particular temperature of operation, the proportions of lime, silica, and alumina can be adjusted within the range indicated to produce a residue having a fusion temperature higher than the temperature of operation and, accordingly, to produce a powdered or easily powderable residue. The fusion temperatures of the residues included within the scope of the present invention vary from about 1500° C. upward, and can be determined for any specific compositions from the well-known $CaO$—$SiO_2$—$Al_2O_3$ ternary diagram, e. g. as reproduced in Jour. Amer. Ceram. Soc. 6, 524 (1933).

In practice the magnesium oxide, carbon, and such of the oxides, lime, silica, and alumina, as are not present in the magnesium oxide-containing material in suitable proportions are mixed as hereinbefore explained and ground to a fine powder. In order to avoid blowing the powdered charge into the magnesium condensing system during reduction the mixture may, if desired, be formed into briquettes with the aid of a tar binder, or other carbonaceous binder, and baked. The charge in the form of briquettes is then introduced into the reduction furnace and heated to a suitable temperature below the fusion temperature of the $CaO$—$SiO_2$—$Al_2O_3$ residue under nonoxidizing conditions, i. e. under reduced pressure or in the presence of an inert gas such as hydrogen or helium. At the operating temperatures magnesium is liberated as a vapor, which may be withdrawn and condensed to recover the metal. The powdered or easily powderable residue, consisting essentially of lime, silica, and alumina, may be easily removed from the furnace by means of a screw conveyor.

I claim:

1. In a process for the production of magnesium, the steps of forming a charge consisting essentially of magnesium oxide, carbon in a proportion at least chemically equivalent thereto, and the oxides lime, silica, and alumina in such proportions that the residue formed on reduction amounts to less than 20 per cent of the total charge and has the composition:

| | Per cent by weight |
|---|---|
| $CaO$ | 52 to 98.8 |
| $SiO_2$ | 0.1 to 48 |
| $Al_2O_3$ | 0.1 to 30 | and heating the charge at a reduction temperature below the fusion temperature of the residue to liberate magnesium as a vapor.

2. In a process for the production of magnesium, the steps of forming a charge consisting essentially of magnesium oxide, carbon in a proportion at least chemically equivalent thereto, and the oxides lime, silica, and alumina in such proportions that the residue formed on reduction amounts to less than 20 per cent of the total charge and has the composition:

| | Per cent by weight |
|---|---|
| $CaO$ | 55 to 98.8 |
| $SiO_2$ | 0.1 to 15 |
| $Al_2O_3$ | 0.1 to 30 | and heating the charge at a reduction temperature below the fusion temperature of the residue to liberate magnesium as a vapor.

3. In a process for the reduction of magnesium oxide with carbon in a proportion at least chemically equivalent thereto, the steps of adjusting the composition of the charge to contain lime, silica, and alumina in such proportions that the residue formed on reduction amounts to less than 20 per cent of the total charge and has the composition:

| | Per cent by weight |
|---|---|
| $CaO$ | 52 to 98.8 |
| $SiO_2$ | 0.1 to 48 |
| $Al_2O_3$ | 0.1 to 30 | and heating the charge at a reduction temperature below the fusion temperature of the residue to liberate magnesium as a vapor.

4. In a process for the reduction of magnesium oxide with carbon in a proportion at least chemically equivalent thereto, the steps of adjusting the composition of the charge to contain lime, silica, and alumina in such proportions that the residue formed on reduction amounts to less than 20 per cent of the total charge and has the composition:

| | Per cent by weight |
|---|---|
| $CaO$ | 55 to 98.8 |
| $SiO_2$ | 0.1 to 15 |
| $Al_2O_3$ | 0.1 to 30 | and heating the charge at a reduction temperature below the fusion temperature of the residue to liberate magnesium as a vapor.

5. In a process for the production of magnesium the steps of forming a powdered charge consisting essentially of magnesium oxide, carbon in a proportion at least chemically equivalent thereto, and the oxides lime, silica, and alumina in such proportions that the residue formed on reduction amounts to less than 20 per cent of the total charge and has the composition:

| | Per cent by weight |
|---|---|
| $CaO$ | 52 to 98.8 |
| $SiO_2$ | 0.1 to 48 |
| $Al_2O_3$ | 0.1 to 30 | mixing the powdered charge with a carbonaceous binder; briquetting the mixture; and heating the briquettes at a reduction temperature below the fusion temperature of the residue to liberate magnesium as a vapor.

6. In a process for the production of magnesium by the reduction of magnesia with carbon wherein the magnesia employed contains as impurity a small proportion of at least one of the oxides lime, silica, and alumina, the method of insuring retention of the said impurities in the reduction zone in the form of a powdered residue which comprises adding such other of the oxides lime, silica, and alumina to the reduction charge in proportions relative to that of the impurity as to insure that the total residue to be formed represents less than 20 per cent by weight of the charge, has a fusion temperature above the reduction temperature to be employed, and has a composition falling within the limits

| | Per cent by weight |
|---|---|
| $CaO$ | 52 to 98.8 |
| $SiO_2$ | 0.1 to 48 |
| $Al_2O_3$ | 0.1 to 30 |

ROY C. KIRK.